(12) United States Patent
Blake et al.

(10) Patent No.: US 8,333,421 B2
(45) Date of Patent: Dec. 18, 2012

(54) VEHICLE SEAT FRONT FLOOR LATCH AND SEAT POSITIONER ASSEMBLY

(75) Inventors: Michael A. Blake, Plymouth, MI (US); Robert L. Haeske, Milan, MI (US); Brent C. Everett, Warren, MI (US)

(73) Assignee: Porter Group, LLC, Novi, MI (US)

( * ) Notice: Subject to any disclaimer, the term of this patent is extended or adjusted under 35 U.S.C. 154(b) by 116 days.

(21) Appl. No.: 13/052,224

(22) Filed: Mar. 21, 2011

(65) Prior Publication Data

US 2012/0242106 A1  Sep. 27, 2012

(51) Int. Cl.
*B60N 2/02* (2006.01)

(52) U.S. Cl. .................................... 296/65.03

(58) Field of Classification Search ............. 296/65.03; 297/317, 325, 331, 336
See application file for complete search history.

(56) References Cited

U.S. PATENT DOCUMENTS

| | | | |
|---|---|---|---|
| 6,412,849 B1 * | 7/2002 | Fast | 296/65.03 |
| 7,000,990 B1 | 2/2006 | Liu et al. | |
| 7,367,604 B2 | 5/2008 | Miller et al. | |
| 7,431,371 B2 * | 10/2008 | Miller et al. | 296/65.03 |
| 2002/0024228 A1 * | 2/2002 | Glaser | 296/65.03 |
| 2006/0125273 A1 * | 6/2006 | Lutzka et al. | 296/65.03 |

* cited by examiner

*Primary Examiner* — Lori Lyjak
(74) *Attorney, Agent, or Firm* — Brooks Kushman P.C.

(57) ABSTRACT

A vehicle seat front floor latch and positioner assembly (26) for a rear vehicle seat (10) movable between a seating position, a generally horizontal nonuse position, and a generally vertical storage position as well as being removable from the vehicle to increase cargo capacity.

10 Claims, 10 Drawing Sheets

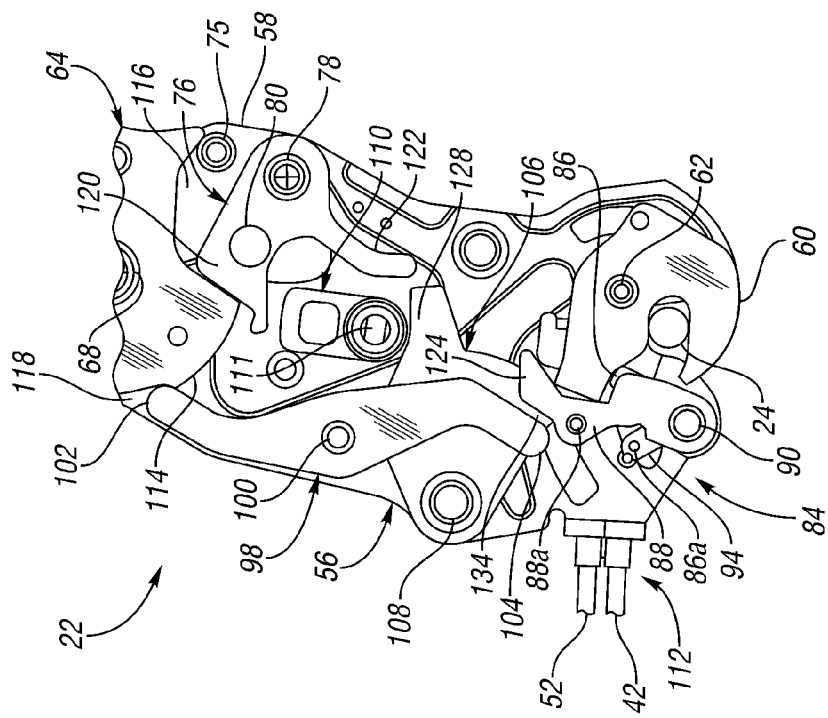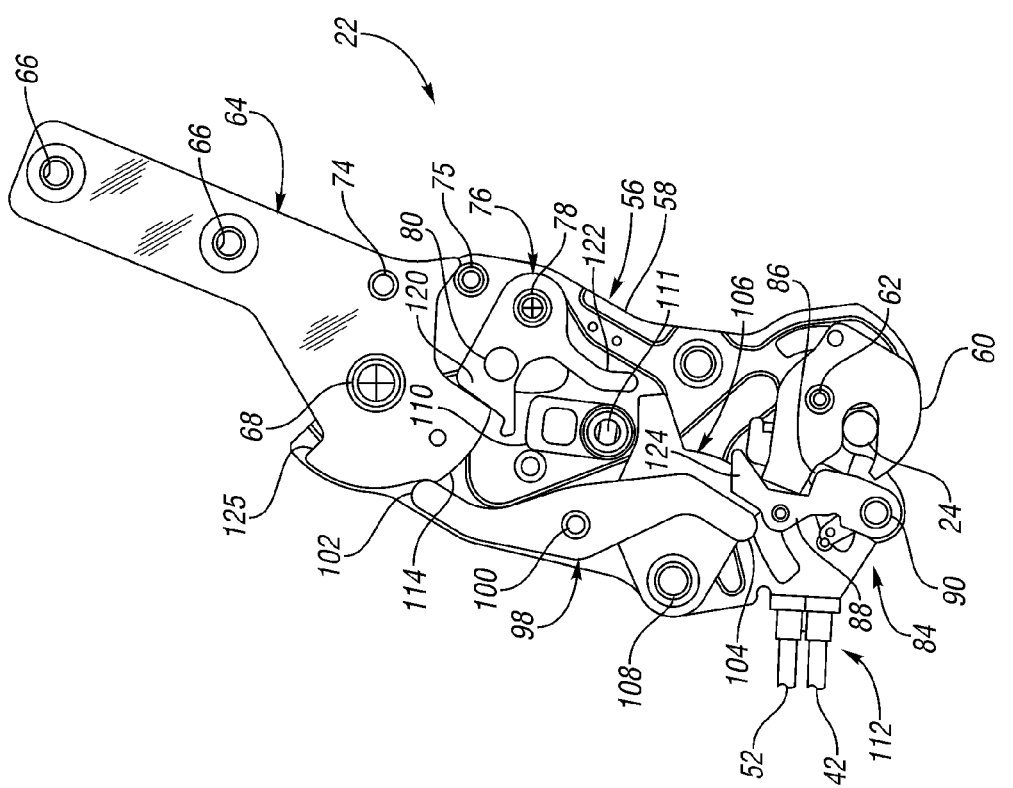

VEHICLE SEAT FRONT FLOOR LATCH AND SEAT POSITIONER ASSEMBLY

TECHNICAL FIELD

This invention relates to a vehicle seat front floor latch and positioner assembly for vehicle seat movable between a seating position, a generally horizontal nonuse or cargo position, and a generally vertical tumble position as well as having the capability of being removed from the vehicle to provide increased cargo capacity.

BACKGROUND

Vehicle seats movable between seating and other positions are disclosed by U.S. Pat. Nos. 7,000,990 Liu et al. and 7,367,604 Miller et al.

SUMMARY

An object of the present invention is to provide an improved vehicle seat front floor latch and positioner assembly.

In carrying out the above object, the vehicle seat front floor latch and seat positioner assembly includes a housing for connection to vehicle floor adjacent the front of a vehicle seat bottom and including a pair of spaced plates. A seat bottom connector lever of the assembly is connectable to a vehicle seat bottom and is pivotally mounted between the pair of spaced plates of the housing for movement between a generally horizontal seating position and a generally vertical tumble position. A control cam of the assembly is pivotally mounted between the spaced plates of the housing and has a locking position for holding the seat bottom connector lever in either its generally horizontal seating position or its generally vertical tumble position, and the control cam has a released position where the seat bottom connector lever is free to move between its generally horizontal seating position and its generally vertical tumble position. A latch mechanism of the assembly includes a friction latch and a structural latch pivotally mounted about a common axis between the spaced plates of the housing. The friction latch has a latched position for contacting a keeper on the vehicle floor with an inclined pressure angle to secure the housing to the vehicle floor, and the friction latch is movable to a released position to release the keeper. The structural cam has a latched position for facing the keeper in a spaced relationship at a generally zero pressure angle to secure the housing to the vehicle floor upon loading of the latch mechanism above a load limit of the friction latch, and the structural latch has a released position to release the keeper. A blocking member of the assembly has a pivotal connection providing pivotally mounting of the blocking member on the housing between the spaced plates thereof for movement between a blocking position and a released position. The blocking member includes a blocking portion on one side of the pivotal connection and a control portion on the opposite side of the pivotal connection from the blocking portion. The seat bottom connector lever contacts the control portion of the blocking member in the generally horizontal seating position to position the blocking member in its released position where its blocking portion permits movement of the friction latch and structural latch from their respective latched positions to their respective released positions to release the keeper and release the housing from the vehicle floor. The seat bottom connector lever upon movement to its generally vertical tumble position allows movement of the blocking member to its blocking position where the blocking portion of the blocking member blocks movement of the friction latch and the structural latch from their respective latched positions to their respective released positions to maintain securement of the housing to the keeper and the vehicle floor.

As disclosed, the blocking member is made of a synthetic resin, the housing includes a keeper opening for cooperating with a second keeper on the vehicle floor and the first mentioned keeper on the vehicle floor to secure the housing to the vehicle floor, the housing includes at least one wheel for facilitating removal of the assembly from the vehicle, and the housing actually includes front and rear wheels for facilitating removal of the assembly from the vehicle.

The vehicle seat front floor latch and seat positioner assembly as disclosed includes a spring that biases the seat bottom connector lever from its generally horizontal seating position toward its generally vertical tumble position, and the control cam has a first portion that when in its locking position contacts the seat bottom connector portion in its generally vertical tumble position to prevent movement of the seat bottom connector lever to its generally horizontal seating position. The control cam has a second portion that when in its locking position contacts the seat bottom connector lever to prevent movement from its generally horizontal seating position to its generally vertical tumble position. More specifically, the second portion of the control cam in its locking position allows a slight amount of angular movement less than 10 degrees of the seat bottom connector lever from its generally horizontal seating position toward its generally vertical tumble position before contacting the seat bottom connector lever to prevent farther movement to the generally vertical tumble position under the bias of the spring. The first portion of the control cam contacts the seat bottom connector lever at a first portion thereof and the second portion of the control cam contacts the seat bottom connector lever at a second portion thereof spaced from its first portion.

A spring that biases the blocking member from its released position toward its blocking position.

BRIEF DESCRIPTION OF THE DRAWINGS

FIG. 9 is a view that illustrates components of the rear latch and positioner assembly with a seat back connector lever thereof shown in an upright seating position for supporting the seat back in its generally vertical position shown in FIG. 3.

FIG. 10 is a partial view of FIG. 9 shown at an enlarged scale.

DETAILED DESCRIPTION OF THE PREFERRED EMBODIMENT

Figure 1:
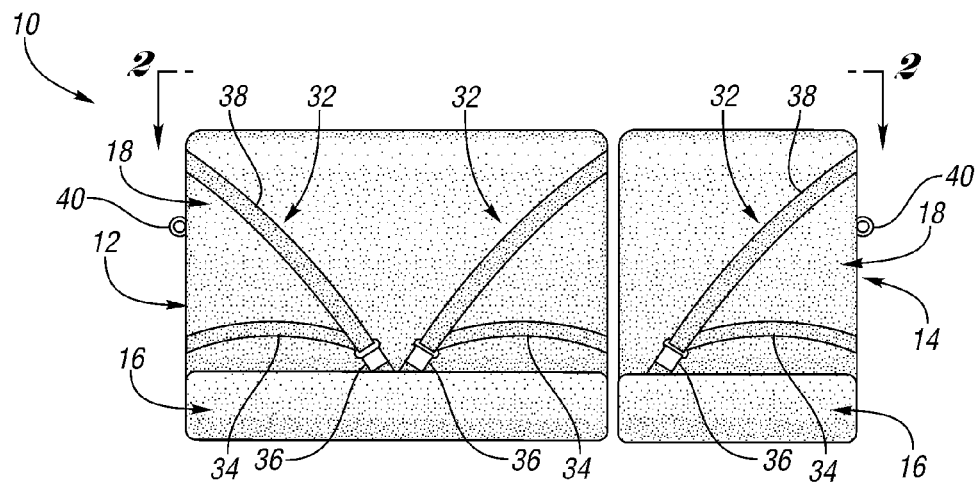
FIG. 1 is a an elevational view of a vehicle rear seat taken from a forward position looking rearwardly.
Figure 2:
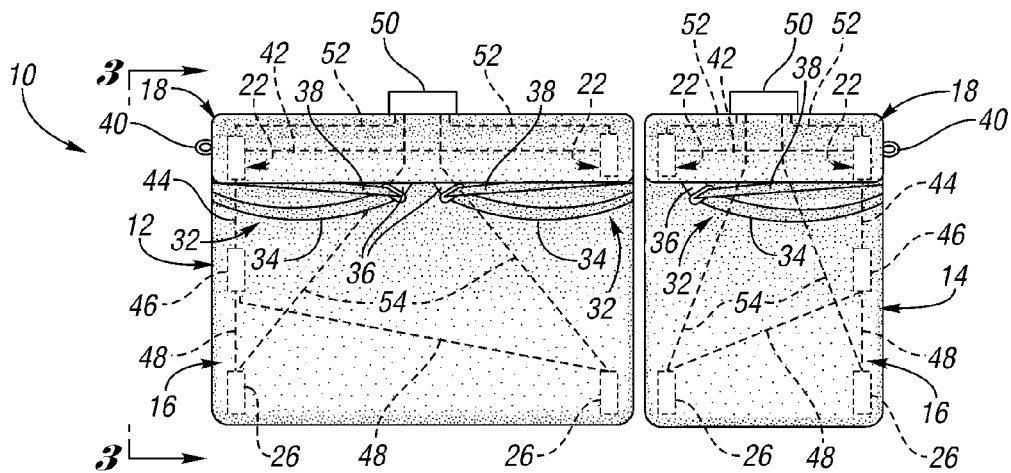
FIG. 2 is a top plan view of the seat taken along the direction of line 2-2 in FIG. 1.
Figure 3:
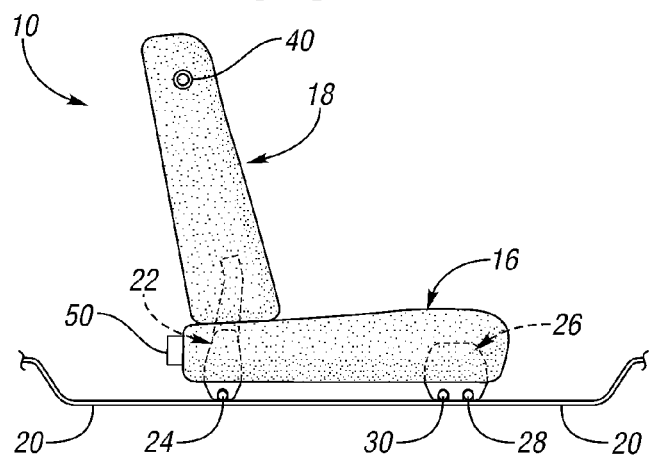
FIG. 3 is an elevational side view of the seat taken along the direction of line 3-3 in FIG. 2.
Figure 4:
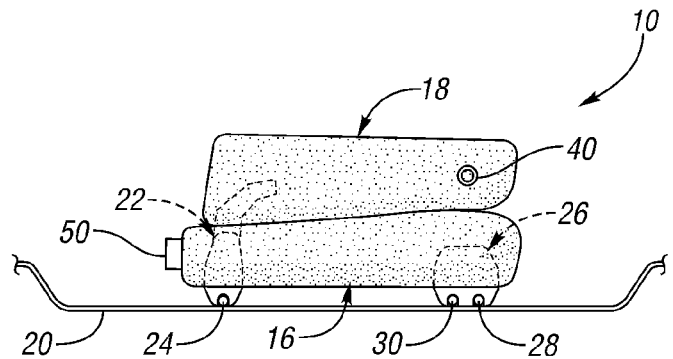
FIG. 4 is an elevational side view similar to FIG. 3 but showing a seat back of the seat moved from a generally upright seating position to a generally horizontal nonuse or cargo position.
Figure 5:
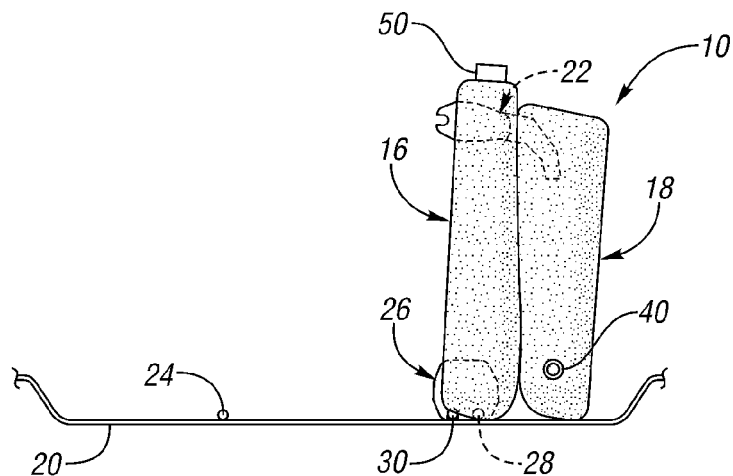
FIG. 5 is an elevational side view of the seat after it has been pivoted from the generally horizontal nonuse position of FIG. 4 to a generally vertical tumble position to provide cargo space in the vehicle to the rear of the seat.
Figure 6:
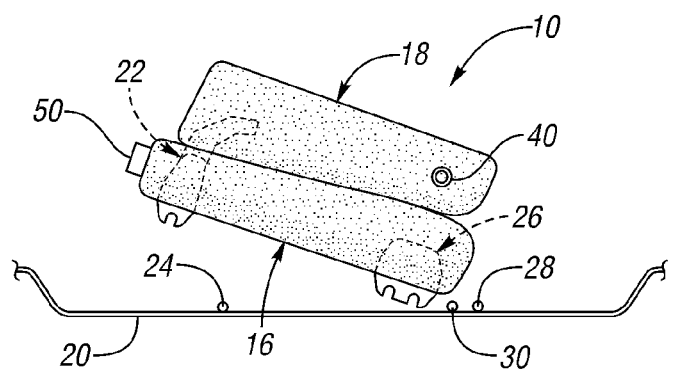
FIG. 6 is a view illustrating the seat after it has been detached from associated vehicle floor keepers for removal.

With reference to FIGS. 1-3, a vehicle body rear seat generally indicated by 10 embodies the invention and has particular utility for use as a vehicle rear seat. The seat 10 actually is an assembly of two seats 12 and 14 that are split in a 60 percent and 40 percent manner to provide the seat 12 for two passengers and the seat 14 for a single passenger. Each seat as shown in FIG. 3 includes a seat bottom 16 and a seat back 18 and is mounted on a vehicle floor 20. Each seat bottom 16 includes a pair of vehicle seat rear floor latch and seat back positioner assemblies 22 which are hereinafter referred to as rear latch assemblies. These rear latch assemblies 22 selectively secure the seat to a rear keeper 24 (FIG. 3) on the vehicle floor 20 and provide support of the seat back 18 on the seat bottom 16 in a generally upright seating position shown in FIG. 3 or a generally horizontal nonuse position on which cargo can be stored as shown in FIG. 4. Each seat bottom 16 also includes a pair of front floor latch and seat positioner assemblies 26 which are hereinafter referred to as front latch assemblies. These front latch assemblies 26 each cooperate with a pair of front keepers 28 and 30 (FIG. 3) on the vehicle floor 20 to selectively secure the seat to the vehicle floor 20. As is hereinafter more fully described, the rear latch assemblies 22 and the front latch assemblies 26 with the seat back in its nonuse position also permit movement of seat bottom and the seat back to a tumble position shown in FIG. 5 as well as permitting removal of the seat from the vehicle floor as shown in FIG. 6 to increase the floor cargo space. The seats 12 and 14 can also be split 50 percent and 50 percent with consequent appropriate revisions in the rear latch and positioner assemblies and the locations of securement of the restraint belt assemblies described below.

As shown in FIGS. 1 and 2, the larger seat 12 includes a pair of restraint belt assemblies 32 for use by two passengers and the smaller seat 14 includes a single restraint belt assembly 32 for use by a single passenger. Each restraint belt assembly 32 has a restraint belt including a lap belt 34 with an end attached to the adjacent lateral end of the seat cushion 16 and has another end attached to a releasable buckle 36 for releasable securement to the seat. The restraint belt which extends from the releasable buckle 36 to provide a shoulder belt 38 that extends upwardly and laterally to an upper extremity of the seat back 18 at the adjacent lateral end of the seat. Both rear latch assemblies 22 of the seat 12 and the outboard rear latch assembly 22 of the seat 14 are constructed to withstand loading of the shoulder belts 38 at their upper ends as is hereinafter more fully described, while the inboard rear latch assembly 22 of the seat 14 does not require such capability since it does not carry the load of the upper end of its shoulder belt 38 as do the other rear latch assemblies. The releasable buckles 36 conventionally slide on the belt to provide the required length of the lap and shoulder belts and a retractor at the adjacent lateral end of the lap belt provides the required total belt length.

The outboard end of each seat back 18 includes a release strap 40 that is connected by a suitable cable to the adjacent outboard rear latch assembly 22 as is hereinafter more fully described to provide release of its positioning that permits movement of the seat back 18 from its generally upright seating position shown in FIG. 3 to its generally horizontal nonuse position shown in FIG. 4. The release strap 40 may also be a lever or any other suitable release actuator. The larger seat 12 includes a slave control cable 42 (FIG. 2) that extends from the outboard rear latch assembly 22 to the inboard rear latch assembly 22 to also release the seat back for the movement from the generally upright seating position of FIG. 3 to the generally horizontal nonuse position of FIG. 4. Note that the inboard rear latch assembly 22 of the smaller seat 14 does not have the same components as the others since it does not carry any shoulder belt loading and thus does not have the components that control the seat back pivoting, i.e., it is freewheeling. However the smaller seat 14 does have a slave cable 42 extending from its outboard rear latch assembly 22 to its inboard rear latch assembly 22 to unlatching if the inboard one by the outboard one as is hereinafter more fully described.

With continuing reference to FIG. 2, a control cable 44 extends from each outboard rear latch assembly 22 to a cable splitter 46 from which a pair of control cables 48 respectively extend to the associated outboard and inboard front latch assemblies 26. After each release strap 40 has been pulled sufficiently to allow the seat back to move to its generally horizontal nonuse position of FIG. 4, continued actuation of the release strap 40 releases the rear latch and positioner assemblies 22 from their associated floor keepers and also through the control cable 44, cable splitter 46, and control cables 48 actuate the front latches 26 to permit the seat movement from the horizontal nonuse position of FIG. 4 to the generally vertical tumble position of FIG. 5 that provides increased floor cargo space.

With reference back to FIG. 2, a remove actuator 50 of each seat has a pair of control cables 52 respectively connected to the associated pair of rear latch assemblies 22 and also has a pair of control cables 54 respectively connected to the associated pair of front latch assemblies 26. Operation of the remove actuator 50 through its associated control cables releases both the rear and front latch assemblies 22 and 26, respectively, as is hereinafter more fully described to permit removal of the seat as shown in FIG. 6.

Each of the control cables 42, 44, 48, 52 and 54 is of the conventional sheave type including a flexible outer sheathe of an elongated construction with opposite ends fixedly connected to latch components and through which a control wire extends for connection that provides the respective actuation.

Figure 8:
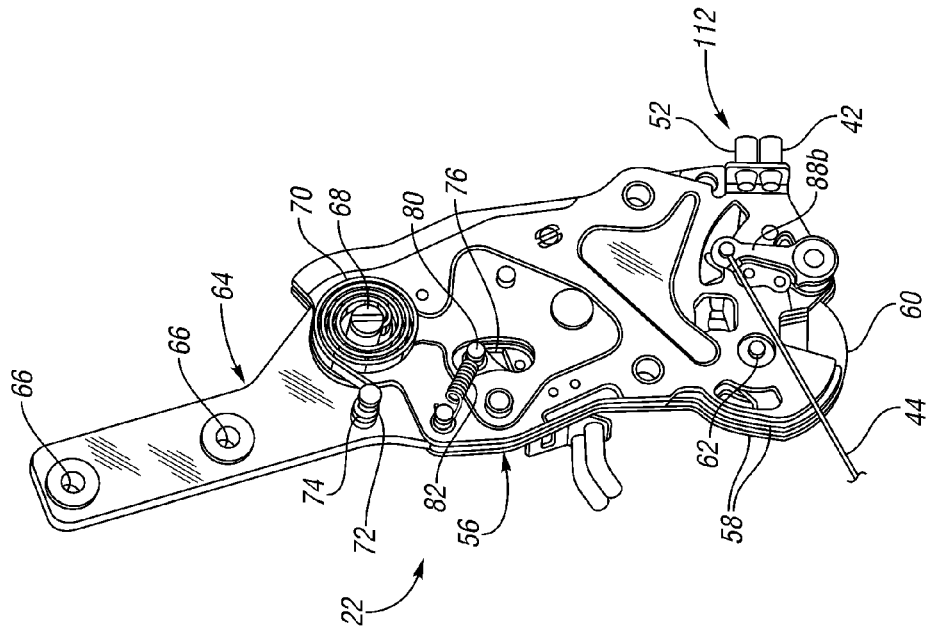
FIG. 8 is a perspective view of the rear latch and positioner assembly taken from the opposite side as FIG. 7.
Figure 7:
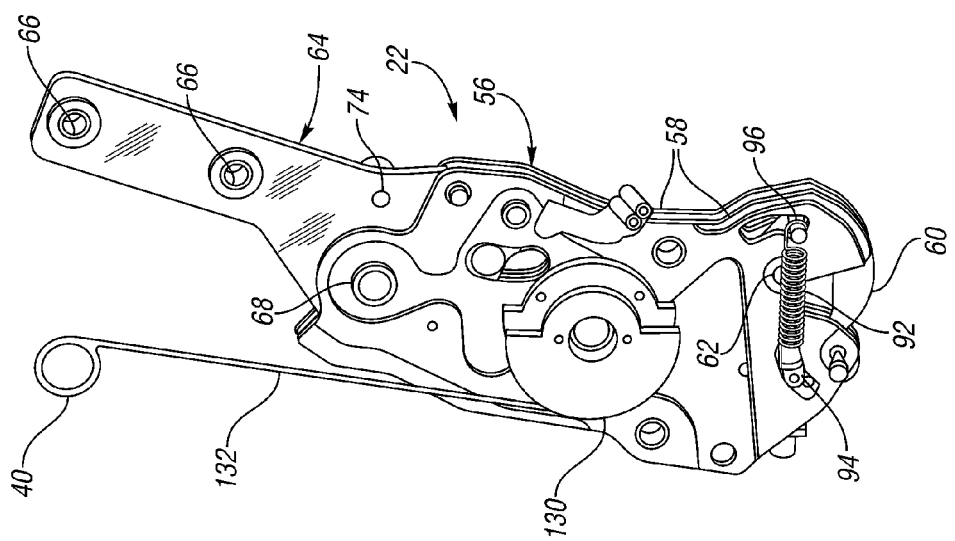
FIG. 7 is a perspective view that illustrates the construction of rear latch and positioner assemblies of the seat.
Figure 12:
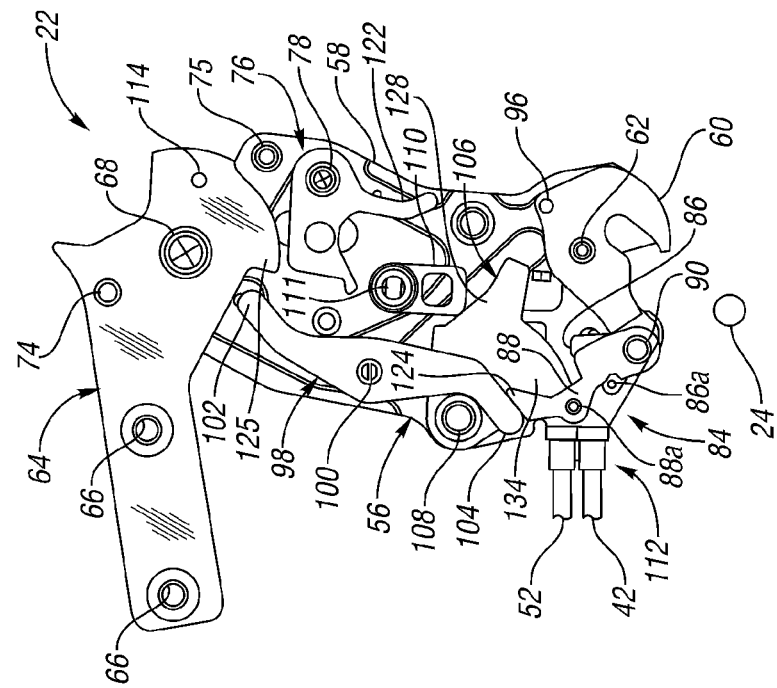
FIG. 12 is a view similar to FIG. 11 but showing the rear latch and positioner assembly after it is actuated for movement of the seat to the generally vertical tumble position of FIG. 5.
Figure 13:
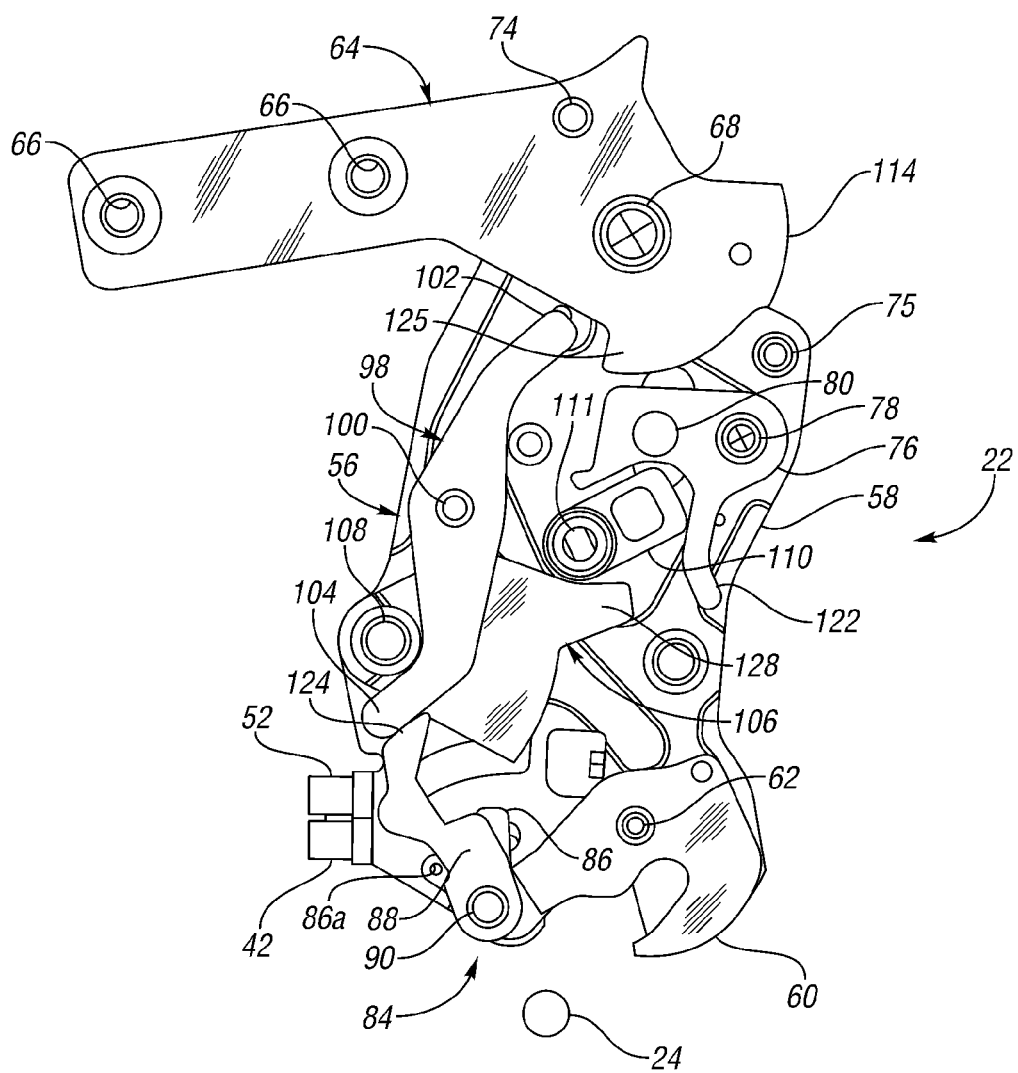
FIG. 13 is a view similar to FIG. 11 but illustrating the construction of the rear latch positioner and assembly after it is actuated for removal of the seat as shown in FIG. 6.

As illustrated in FIGS. 7 and 8, each rear latch assembly 22 includes a housing 56 for connection to the vehicle seat bottom and has a pair of spaced plates 58 between which most of its components are located. The housing 56 may be of a one piece construction with a flange that connects the spaced plates 58 or may be made of separate plates 58 in a two piece construction. A latch 60 of the assembly is pivotally mounted between the pair of spaced plates 58 by a pin 62 for movement between a latched position as shown in FIGS. 7-11 for securing the housing to the associated vehicle floor keeper and hence the floor and an unlatched position as shown in FIGS. 12 and 13 where the associated vehicle floor keeper is released so the housing is released from its secured position. A seat back connector lever 64 has connection openings 66 for connection to the associated vehicle seat back 18 and is pivotally mounted between the spaced plates 58 of housing 56 by a pivot pin 68 to support the seat back for movement between its generally upright seating position of FIG. 3 and its horizontal nonuse position parallel to the seat back 18 as shown in FIG. 4. A spiral spring 70 extends around the pivot pin 68 as shown in FIG. 8 and has an outer end 72 connected to a pin 74 on the connector lever 64 to provide biasing thereof toward the generally vertical upright seating position where it contacts a stop 75 on the housing.

Figure 11:
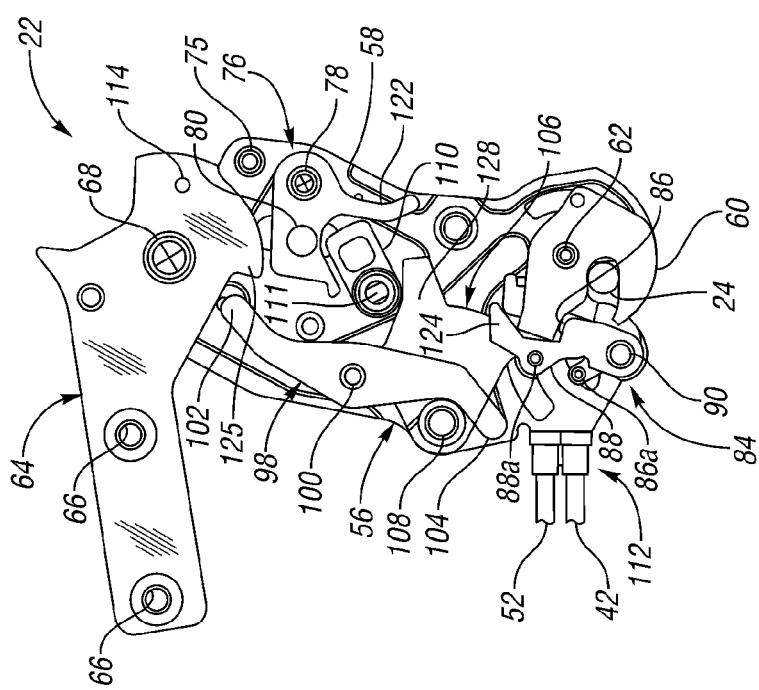
FIG. 11 is a view illustrating the components of the rear latch and positioner assembly after pivotal movement of the seat back connector to a generally horizontal position corresponding to the FIG. 4 nonuse position.

As shown in FIGS. 9 and 10, a locking cam 76 of the assembly is pivotally mounted by a pin 78 between the spaced plates 58 of housing 56 and has a blocking position as shown for holding the seat back connector lever 64 in the generally upright seating position by preventing counterclockwise movement about its pivot pin 68. As shown in FIG. 11, the locking cam 76 also has a released position where the seat back connector lever 64 is free to move from its generally upright seating position to its generally horizontal nonuse position in a pivotal manner about pin 68. A connection pin 80 of the locking cam 76 extends outwardly through an arcuate slot in one of the spaced plates as shown in FIG. 8 and is connected to a spring 82 that is also connected to the housing to pivotally bias the locking cam toward its blocking position.

As shown in FIGS. 9-12, a latch cam mechanism 84 of the assembly includes a friction cam 86 and a structural cam 88 that are both pivotally mounted between the housing plates 58 by a pin 90. The friction cam 86 has a blocking position shown in FIGS. 9-11 for contacting the latch 60 with an inclined pressure angle that holds the latch in its latched position. The friction cam 86 is movable as is hereinafter described to a released position as shown in FIG. 12 to release the latch 60 for movement to its unlatched position that frees the associated floor keeper 24 to permit detachment from the vehicle floor. The structural cam 88 of the latch cam mechanism 84 also has a blocking position for facing the latch 60 in a spaced relationship at a generally zero pressure angle to hold the latch in its latched position upon loading of the latch cam mechanism above a load limit of the friction cam 86 with the inclined pressure angle. The structural cam 88 also has a released position as shown in FIG. 12 where the latch 60 is free to move from its latched position to its released position to release the keeper 24.

As shown in FIG. 7, a helical spring 92 extends outside of the spaced housings 58 of housing 56 between a projection on an arm 94 of the friction cam 86 and a pin 96 on the latch 60 in an overcenter relationship with respect to the latch pin 62 so as to alternatively bias the latch to its latched position or its unlatched position. The spring 92 also provides continual biasing of the friction cam 86 toward its blocking position. Movement of the latch 60 to its unlatched position as described later causes the spring 92 to move overcenter with respect to the pivot 62 and bias the latch 60 toward its unlatched position from which it can be subsequently moved by contact with the associated keeper 24 to the latched position for relatching.

The slave control cables 42 and the removal control cables 52 also have connections to their associated latch cam mechanisms 84 so as to provide the cooperable operation of the latch assemblies as previously described and as is also hereinafter more fully described.

It should also be noted that the pressure angle is the angle at which a blocking type cam or a latch contacts a latch component or keeper to maintain a latched condition. An inclined pressure angle on the order of about 3 to 6 degrees allows the blocking component to be moved to a released position even when there is pressure between the contacting surfaces. A zero degree pressure angle means there is no inclined angle and thus there is greater difficulty in providing the movement from the blocking position for unlatching. The construction shown with the friction cam 84 having an inclined angle allows the removal while the structural cam 86 in case of excessive loading contacts the latch to maintain its latched position.

All of the rear latch assemblies 22 except for the inboard one of the smaller seat 14 also each have an interlock link 98 pivotally mounted by a pin 100 between the housing plates 58. No interlock link is required on the inboard end of the smaller seat 14 because its seat back 18 does not carry the lap belt loading and can thus be freewheeling. The interlock link 98 has first and second ends 102 and 104 for respectively contacting the seat back connector lever 64 and the latch cam mechanism 84 to prevent movement of the friction cam 86 and the structural cam 88 to their respective released positions when the seat back connector lever 64 is in its upright seating position as shown in FIGS. 9 and 10. Thus, each rear latch assembly 22 maintains the connection with the vehicle floor whenever the seatback is in its upright seating position. When the seat back connector lever 64 is in its horizontal nonuse position, the interlock link 98 is permitted to rotate clockwise from its position shown in FIGS. 9 and 10 such that its lower end permits the friction cam 86 and structural cam 88 of the latch cam mechanism 84 to move from their respective blocking positions to their respective released positions as shown in FIG. 12 so that the housing 56 is then free for unlatching of latch 60 from the associated vehicle floor keeper 24. The interlock link 98 also prevents the seat back connector lever 64 from moving from the generally horizontal position to the generally upright position when the latch cam mechanism is in its unlatched position.

Thus, as is hereinafter more fully described, the seat cannot move to its generally vertical tumble position as in FIG. 5 or be removed as shown in FIG. 6 when the seat back is in its upright seating position as illustrated in FIG. 3, nor can the seat back move to its upright seating position when the seat is detached from the floor.

As best illustrated in FIG. 10, a release member 106 of each rear latch assembly 22 is pivotally mounted on the housing 56 between its spaced plates 58 by a pivot pin 108 for moving the latch cam mechanism 84 so its friction cam 86 and its structural cam 88 are moved from their respective blocking positions as shown in FIGS. 10 and 11 to their respective released positions as shown in FIG. 12, with such movement allowing the unlatching of the housing of the rear latch assembly from the associated vehicle floor keeper 24.

An actuating member 110 of each rear latch assembly 22 is pivotally mounted by a pin 111 on the housing 56 between the spaced plates 58 of the housing for pivotal movement from an idle position shown in FIG. 10 to a first released position shown in FIG. 11 to move the locking cam 76 from its blocking position shown in FIG. 10 to its released position shown in FIG. 11 so the seat back connector lever 64 is movable from its generally upright seating position to its generally horizontal nonuse position. Continued clockwise pivotal movement of the actuating member 110 from its first released position shown in FIG. 11 to a second released position shown in FIG. 12 pivotally moves the release member 106 to move the latch cam mechanism 84 so its friction cam 86 and its structural cam 88 are moved from their respective blocking positions shown in FIG. 11 to their respective released positions shown in FIG. 12 so as to allow the latch 60 to move from its latched position of FIG. 11 to its released position of FIG. 12. More specifically, the pivoting movement of the release member 106 about pivot pin 108 provides contact thereof with a projection 88a on the structural cam 88 to pivotally move the structural cam counterclockwise from its blocking position to its released position as shown in FIG. 12, and this movement contacts the structural cam 88 with a projection 86a on the friction cam 86 to pivotally also move the friction cam 86 counterclockwise from its blocking position to its released position.

As shown in FIG. 8, the control cable 44 is connected to an arm 88b of the structural cam 88 on the outside of the adjacent spaced plate 58 of the housing and is pivotally fixed to its support pin 90 as is the structural cam, unlike the frictional cam 88 that freewheels on pin 90. The pivotal movement of the structural cam 86a upon being moved to its released position operates control cable 44 and through the cable splitter 46 and control cables 48 shown in FIG. 2 releases the front latch assemblies 26 for movement from their horizontal nonuse position of FIG. 4 to the vertical tumble position of FIG. 5 as is hereinafter more fully described.

The latch cam mechanism 84 also has a connector 112 at which the control cables 42 and 52 are connected so as to move its structural cam 88 and hence its frictional cam 86 as described above by its projection 86a from their respective blocking positions to their respective released positions independently of any movement of the actuating member 110 from its first released position to its second released position which is the release operation that takes place when the seat is being removed from the vehicle floor as shown in FIG. 6 and as is hereinafter more fully described.

As illustrated in FIGS. 9 and 10, the locking cam 76 contacts the seat back connector lever 64 to maintain the seat back connector lever in the generally upright seating position contacting the stop 75. More specifically, the seat back connector lever 66 has a positioning lobe 114 including opposite sides 116 and 118 (FIG. 10) that are respectively contacted by the locking cam 76 and the first end 102 of the interlock link 98 in an opposed relationship. The locking cam 76 maintains the seat back connector lever in the generally upright seating position and the interlock link 98 prevents unlatching of the latch cam mechanism with the seat back in its upright seating position. Furthermore, the locking cam 76 has a blocking portion 120 that contacts the seat back connector lever lobe side 116 in the blocking position of the locking cam. The locking cam 76 also has a release arm 122 that is contacted by the actuating member 110 to move the locking cam from its blocking position to its released position to allow the seat back connector lever 64 to move from its generally upright seating position shown in FIGS. 9 and 10 (corresponding to FIG. 3) to its generally horizontal nonuse position as shown in FIG. 11 (corresponds to FIG. 4).

As best seen in FIG. 10, the structural cam 88 of the latch mechanism 84 includes an interlocking lobe 124 that cooperates with the second end 104 of the interlock link 98 to prevent pivotal movement of the structural cam and thus also the friction cam 86 from their respective blocking positions to their respective released positions when the seat back connector lever is in the generally upright seating position shown in FIG. 9. The interlock link 98 also prevents the seat back connector lever 64 from moving from its horizontal position to its upright seating position when the latch cam mechanism 84 is unlatched as shown in FIG. 12 where the second end 104 of the interlock link contacts the interlocking lobe 124 of the structural cam 88 and the first end 102 of the interlock link blocks clockwise pivoting of the seat back connector lever 64 at its blocking lobe 125.

The release member 106 has a first portion 128 that is contacted by the actuating member 110 upon pivotal actuated movement thereof from its first released position shown in FIG. 11 to its second released position shown in FIG. 12, and the structural cam 88 by contact of the release member first portion 128 with the structural cam projection 88a is then pivotally moved from its blocking position to its released position as the structural cam 88 contacts the projection 86a of the friction cam 86 to move the friction cam from its blocking position to its released position for release of the latch 60. Note that it is important for the structural cam to first move to its released position before the friction cam because there is consequently a zero pressure angle contact that must be overcome to provide the release.

The rotation of the actuating member 110 is by way of a cable driven spool 130, shown in FIG. 7 on outside of one of the spaced plates 58, on which a cable 132 is wound around the spool and pulled by the previously described release strap 40 to initially move the actuating member 110 from its idle position shown in FIGS. 9 and 10 to its first released position shown in FIG. 11. The seat back 18 is thereby allowed to pivot to its horizontal position shown in FIG. 4. Continued pulling of release strap 40 and cable 132 shown in FIG. 8 moves the actuating member 110 to its second released position shown in FIG. 12 and thereby moves a second portion 134 of the release member into engagement with the projection 88a of the structural cam 88 which then moves into engagement with the projection 86a on the friction cam 86 to also move the friction cam to its released position to thereby permit pivoting of the seat from the FIG. 4 horizontal nonuse position to the FIG. 5 vertical tumble position. The slave control cable 42 also has an unshown cable connection to the spool so that the two outboard assemblies 22 can operate the two inboard rear latch assemblies. For the larger seat its slave control cable 42 provides the required release of its inboard rear latch assembly for movement of the seat back from its generally upright seating position to its generally horizontal nonuse position. For the smaller seat 14, the control slave cable 42 does not provide any release of its inboard rear latch assembly for pivoting of its seat back 18 to the nonuse position since that rear latch assembly does not include an interlock link as previously mentioned but its control slave cable 42 does operate to provide unlatching of the inboard rear latch assembly for release from the floor for seat movement to the generally vertical tumble position by a delayed operation of the control slave cable.

From the FIG. 4 horizontal nonuse position of the seat back 18, the remove actuator 50 operates the control cables 52 to pull the structural cam 88 from the blocking position of FIG. 11 to the release position of FIG. 13 which in turn moves the friction cam 86 also from its blocking position to its released position so as to permit movement of the latch 60 to its released position without any pivoting of the actuating member 110 and consequent pivoting of the release member 106 in the manner previously described in connection with movement to the vertical tumble position. This removal operation is also accompanied by actuation of the front latch assemblies 26 through the control cables 54 as is hereinafter more fully described.

Figure 14:
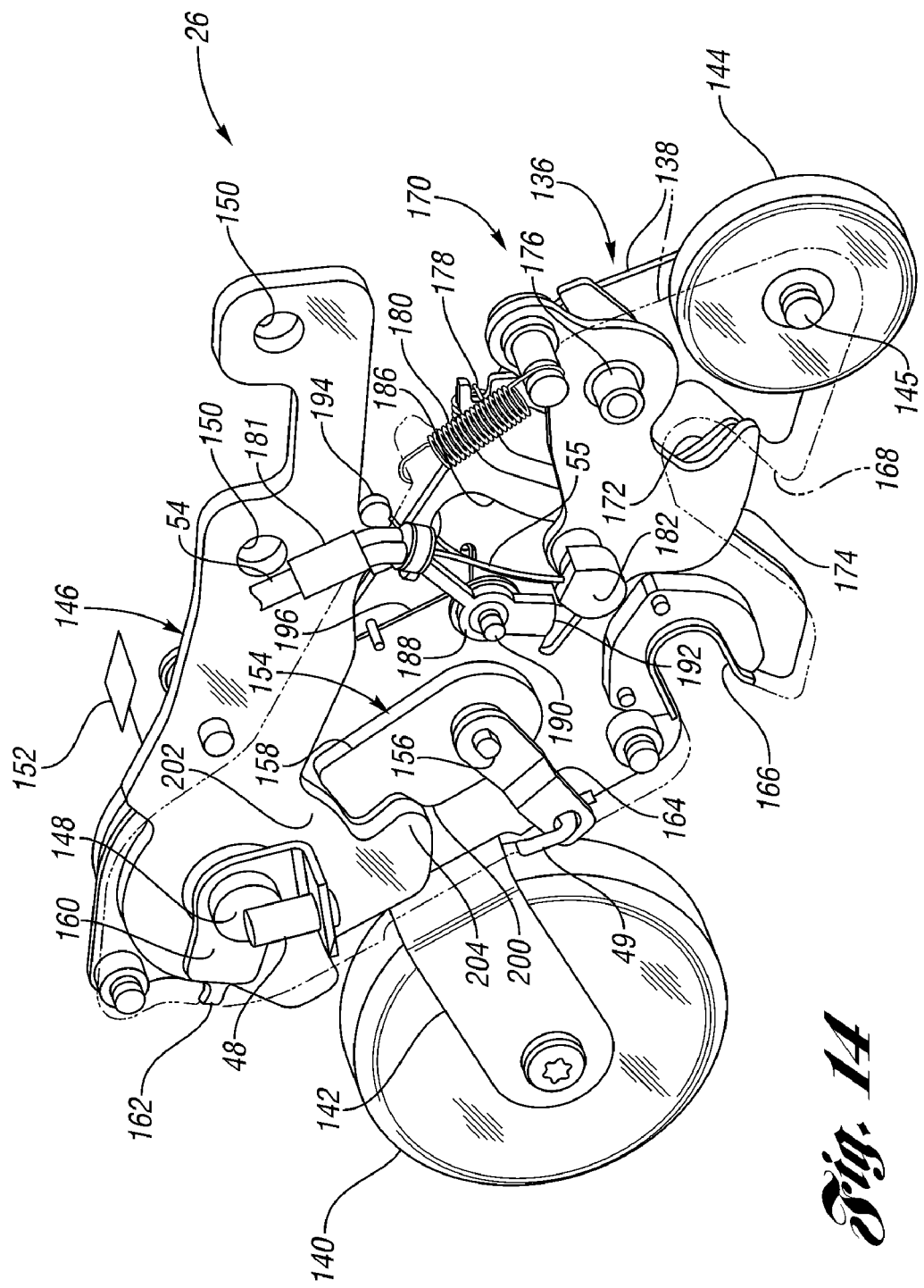
FIG. 14 is a perspective view illustrating the construction of front latch and positioner assemblies of the seat and shown in a position corresponding to the seating position of FIG. 3.
Figure 15:
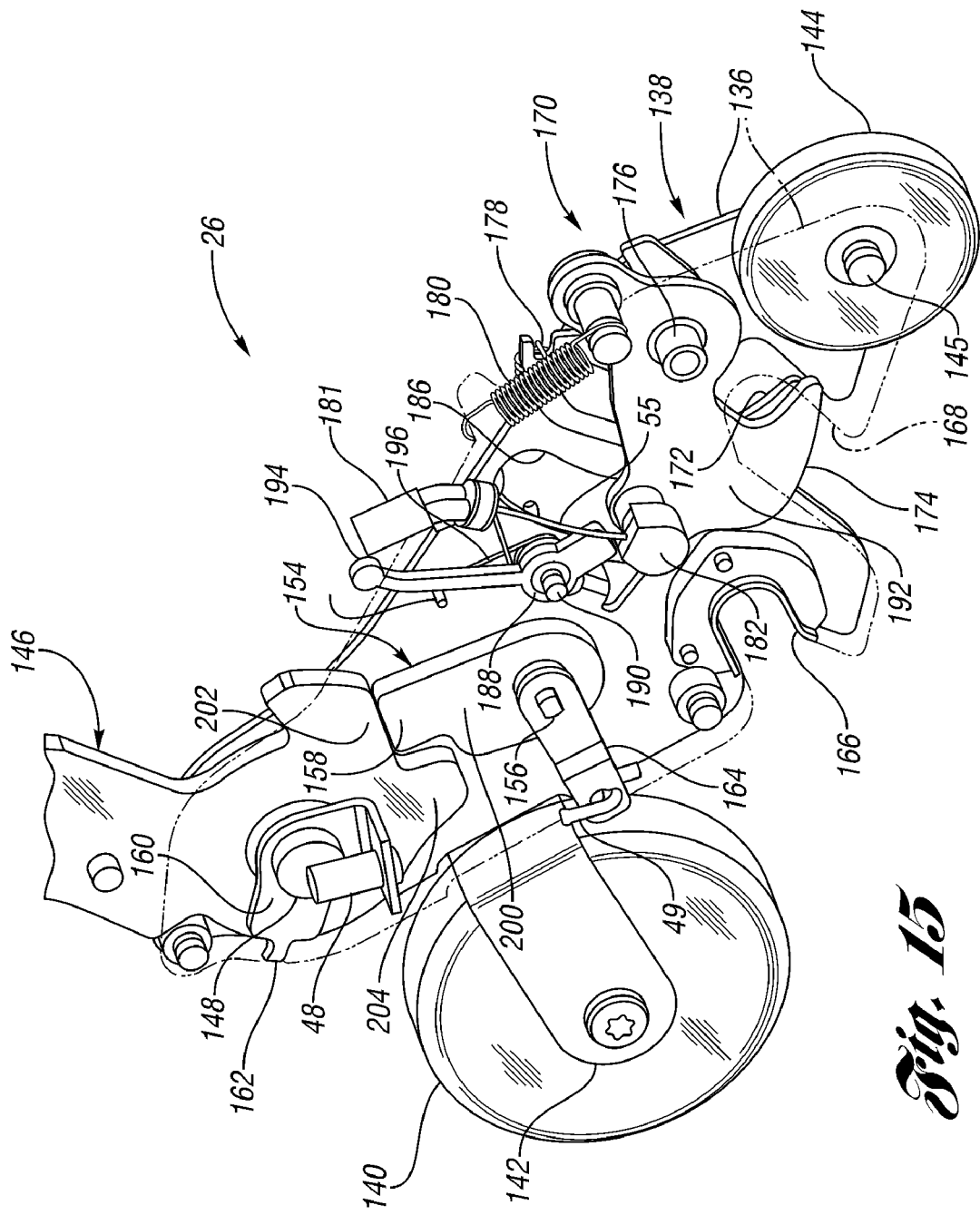
FIG. 15 is a view of the front latch and positioner assembly shown in the generally vertical tumble position corresponding to FIG. 5.
Figure 16:
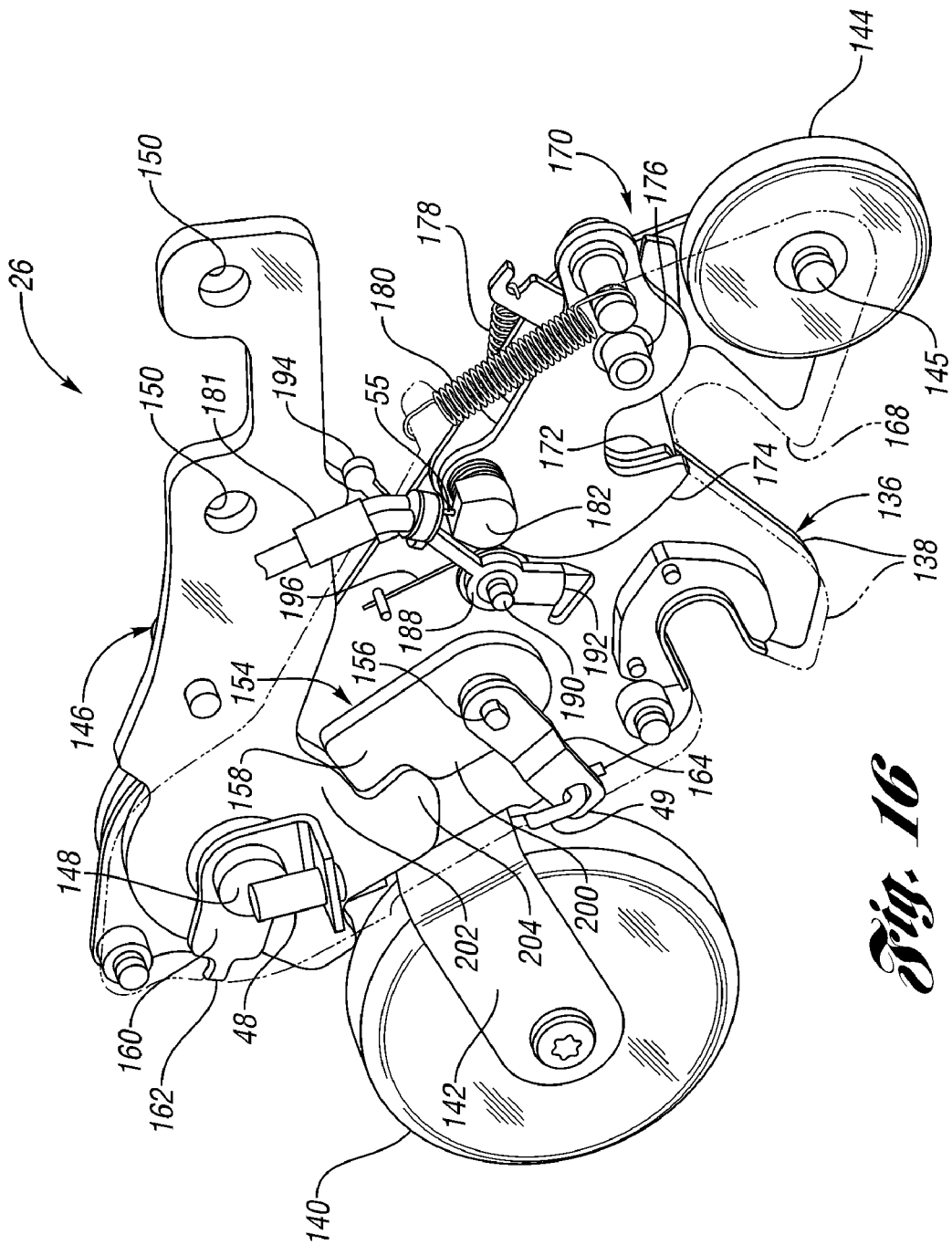
FIG. 16 is a view that illustrates the front latch and positioner assembly upon being unlatched for movement from the position of FIG. 4 to the position of FIG. 6 after unlatching of the rear latch assemblies illustrated in FIGS. 7-13.
Figure 17:
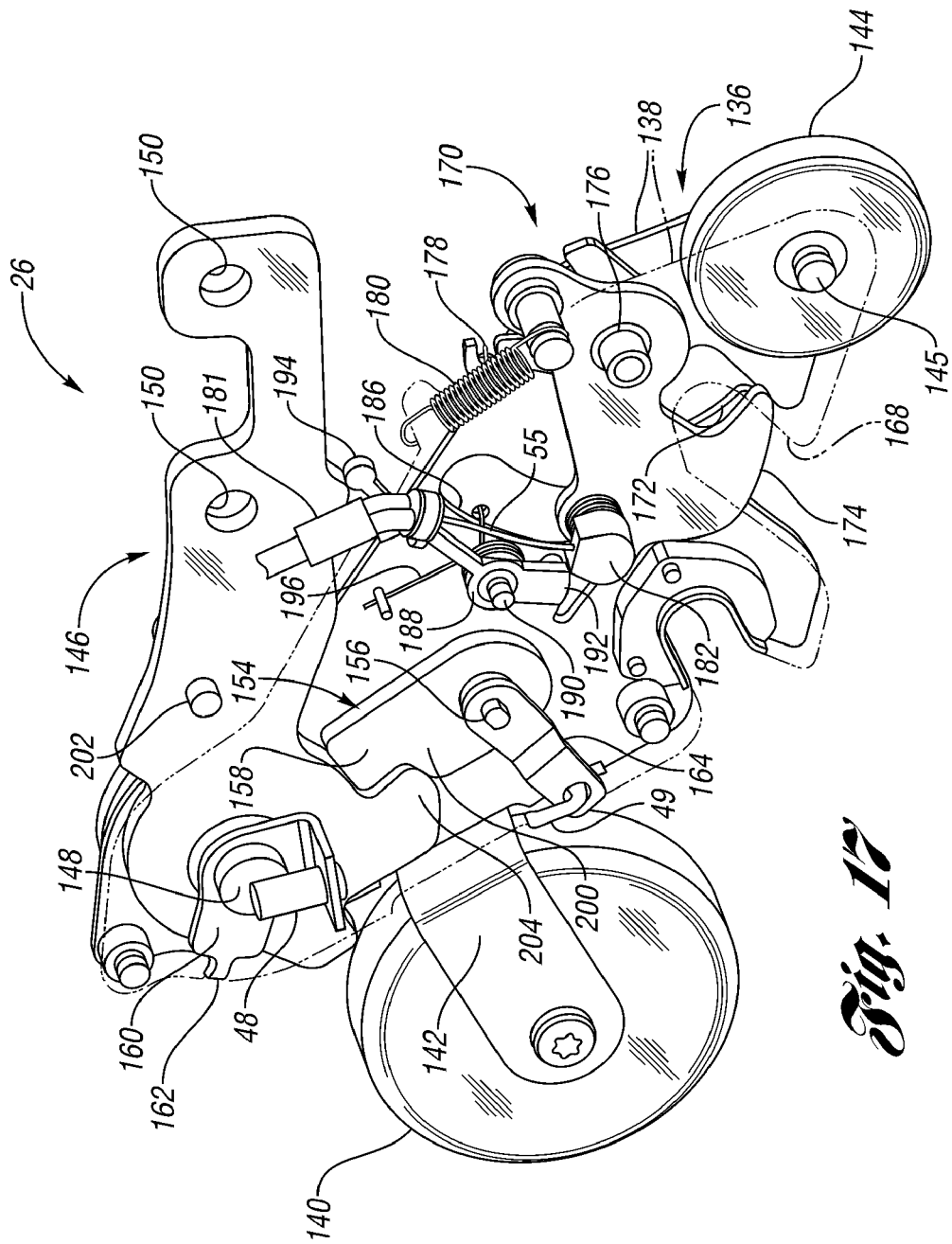
FIG. 17 is a view similar to FIG. 16 but showing the front latch and positioner assemblies after the vehicle seat unlatching is completed for removal of the seat as shown in FIG. 6.

The construction of the front latch assemblies 26 is illustrated in FIGS. 14-17 with the seating position of FIG. 3 as well as the horizontal nonuse position of the seat back 18 of FIG. 4 both illustrated in FIG. 15, the unlatched condition for removal shown in FIG. 16, and the fully removed condition of FIG. 6 shown in FIG. 17.

As illustrated in FIGS. 14-17, each front latch assembly 26 includes a housing 136 for connection to the vehicle floor adjacent the front of the seat bottom 16 as shown in FIGS. 3 and 4. This housing 136 includes a pair of spaced plates 138 between which components of the front latch are mounted as is hereinafter more fully described. A front wheel 140 is supported on a bracket 142 that is mounted on a front end of the housing and a rear wheel 144 is mounted by a pin 145 between the pair of spaced plates 138 at a rear end of the housing to cooperate in supporting the seat for movement during removal and reattachment to the vehicle floor.

Each front latch assembly 26 also includes a seat bottom connector lever 146 that is pivotally mounted by a pin 148 between the space plates 138 of the housing and has connector openings 150 for connection to the seat bottom 60 by suitable fasteners. This seat bottom connector lever 146 is movable between the seating position shown in FIG. 14, which corresponds to the seating position of FIG. 3 as well as the nonuse position of the seat back as shown in FIG. 4, and the tumble position shown in FIG. 15 which corresponds to the vertical tumble position shown in FIG. 5.

A schematically illustrated spiral spring 152 shown in FIG. 14 extends between the outside of the one spaced plate 138 shown in FIG. 14 and the pin 148. The seat bottom connection lever 146 is rotationally fixed to the pin 148 so the spring 158 biases the connection lever toward the tumble position in order to facilitate the upward movement of the seat in a counterbalancing manner from the position of FIG. 4 to the position of FIG. 5.

As shown in FIG. 14, a control cam 154 is pivotally mounted between the pair of spaced plates 138 of the housing and rotationally fixed on a pin 156 for movement between a solid line indicates locking position and a phantom line indicated released position. In the locking position, the control cam has a locking portion 158 for positioning the seat bottom connector lever 146 in either its generally horizontal seating position of FIG. 14 or its generally vertical tumble position of FIG. 15. In the released position, the seat bottom connector lever 146 is free to move between these two positions. Control cable 48 is operable to move the control cam 154 between its locking and released positions and is connected to a bracket 160 mounted by the pin 148 on the outside of the closer spaced housing plate 138 as illustrated and having a tab connection 162 that prevents bracket pivoting with respect to the housing. More specifically, a control wire 49 of control cable 48 extends from the bracket 160 to a control lever 164 also mounted on the outside of the closer housing plate 138 and pivotally fixed on the pin 156 to which the control cam 154 is also pivotally fixed. Extension and retraction of the control wire 49 of the control cable 48 provides the pivoting of the control cam for its positioning in the locking or released position.

The front and rear floor keepers 28 and 30 shown in FIG. 3 are received by front and rear latch openings 166 and 168 of each front latch assembly 26 as shown in FIGS. 14-17 to provide the securement of the front latch housing 136 to the vehicle floor. More specifically, the front latch opening 166 is inclined downwardly in a forward direction and open to freely received the front floor keeper upon forward seat movement and securement to the vehicle floor while the rear latch opening 168 is likewise inclined downwardly in a forward direction with a greater angle of inclination and cooperable with a latch mechanism 170 of the front latch assembly to provide the front latch assembly and this seat securement to the vehicle floor.

As illustrated in FIGS. 14-17, the latch mechanism 170 includes a friction latch 172 and a structural latch 174 pivotally mounted about a common axis by a pin 176 between the spaced plates 138 of the housing. The friction latch 172 has a latched position shown in FIGS. 14, 15 and 17 for contacting the associated vehicle floor keeper with an inclined pressure angle to secure the housing and thus the seat to the vehicle floor. The friction latch 172 is pivotal to a released position shown in FIG. 16 to release the keeper and thereby to permit the seat removal. Furthermore, the structural latch 174 has a latched position as also shown in FIGS. 14, 15 and 17 for facing the associated keeper on the vehicle floor in a spaced relationship at a generally zero pressure angle to secure the housing to the vehicle floor upon loading of the latch mechanism above a load limit of the friction latch 172. A torsion spring 178 extends between the housing and the friction latch 172 to provide biasing thereof toward its latched position and a helical spring 180 extends between the housing and the structural latch 174 to provide biasing thereof to its latched position. Furthermore, the associated removal cable 54 has a connection 181 to the housing 136 and its control wire 55 extends on the outside of the latch housing to a projecting pin 182 extending from the structural latch 174 through an arcuate slot 186 of the adjacent housing plate 138. Upon actuation of the control cable 54 for removal of the seat, the control cable 54 is actuated so its wire 55 pulls the structural latch 174 upwardly from its latched position of FIGS. 14, 15 and 17 to its unlatched position of FIG. 16 for the seat removal. This movement of the structural latch 174 to its unlatched position provides engagement between the structural latch and the friction latch 172 to also move the friction latch to its unlatched position as also shown in FIG. 16.

With further reference to FIGS. 14-17, the front latch and positioner assembly 26 also includes a blocking member 188 having a pivotal connection 190 providing pivotal mounting of the blocking member on the housing 136 between its spaced plates 138 for movement between a blocking position shown in FIG. 15 and a released position shown in FIGS. 14, 16 and 17. The blocking member 188 includes a blocking portion 192 on one side of the pivotal connection 190 and a control portion 194 on the opposite side of the pivotal connection from the blocking portion. A torsion spring 196 extends between the housing and the blocking member 188 to bias the blocking member toward its blocking position shown in FIG. 15.

As shown in FIG. 14, the seat bottom connector lever 146 in its generally horizontal seating position contacts the control portion 194 of the blocking member 188 in the generally horizontal seating position to position the blocking member in its released position where its blocking portion 192 permits movement of the friction and structural latches 172 and 174 from their respective latched positions to their respective release positions to release the associated vehicle floor keeper and release the housing of the assembly and hence the seat from the vehicle floor. The seat bottom connector lever 146 upon movement to its generally vertical tumble position shown in FIG. 16 allows movement of the blocking member 188 to its blocking position where the blocking portion 192 of the blocking member blocks movement of the friction latch 172 and the structural latch 174 from their respective latched positions to their respective released positions to maintain securement of the housing to the associated keeper and the vehicle floor. As disclosed, the blocking member is made of a synthetic resin which may include glass fibers to provide strengthening. The construction of the blocking member with the blocking portion and control portion as shown on opposite sides of the pivotal connection permits a relatively lightweight and easily constructed component to provide the blocking function.

As previously mentioned, the seat bottom connector spring 152 biases the seat bottom connection lever 146 from its generally horizontal seating position of FIG. 14 to its generally vertical tumble position of FIG. 15 where the control cam 154 prevents movement thereof toward its generally horizontal seating position. More specifically, the control cam has a first portion provided by the previously mentioned locking portion 158 that, when in its locking position shown, contacts the seat bottom connector portion in its generally vertical tumble position to prevent movement of the seat bottom connector lever to its generally horizontal seating position.

In the seating position illustrated in FIG. 14 where the rear latch assembly holds the seat bottom connector lever 146 downwardly from upward movement under the bias of its spring 152, the control cam 154 is spaced from this lever but has a second portion 200 that functions to limit pivotal movement of the seat bottom connector lever to its generally vertical tumble position when the rear latch assemblies are released. More specifically, such release of the rear latch assemblies allows the spring 52 to move the seat bottom connector lever a slight amount of angular movement less than 10 degrees, preferably about 5 degrees, from its generally horizontal seating position toward its generally vertical tumble position before contacting the lever and preventing further movement as shown in FIGS. 16 and 17. This slight amount of movement raises the seat at its rear extremity so that the rear latch assemblies after detachment move upwardly and allow disengagement from the associated vehicle floor keepers and removal of the seat in the manner previously described.

The contact of the first locking portion 158 of the control member 154 with the seat bottom connector lever 146 is at a first portion 202 thereof as shown in FIG. 15, while second portion 200 of the control cam contacts the seat bottom connector lever at a second portion 204 thereof spaced from its first portion as shown in FIG. 16.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, while exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat front floor latch and seat positioner assembly comprising:
   a housing for connection to vehicle floor adjacent the front of a vehicle seat bottom and including a pair of spaced plates;
   a seat bottom connector lever for connection to a vehicle seat bottom and pivotally mounted between the pair of spaced plates of the housing for movement between a generally horizontal seating position and a generally vertical tumble position;
   a control cam pivotally mounted between the spaced plates of the housing and having a locking position for holding the seat bottom connector lever in either its generally horizontal seating position or its generally vertical tumble position, and the control cam having a released position where the seat bottom connector lever is free to move between its generally horizontal seating position and its generally vertical tumble position;
   a latch mechanism including a friction latch and a structural latch pivotally mounted about a common axis between the spaced plates of the housing, the friction latch having a latched position for contacting a keeper on the vehicle floor with an inclined pressure angle to secure the housing to the vehicle floor, the friction latch being movable to a released position to release the keeper, the structural cam having a latched position for facing the keeper in a spaced relationship at a generally zero pressure angle to secure the housing to the vehicle floor upon loading of the latch mechanism above a load limit of the friction latch, and the structural latch having a released position to release the keeper;
   a blocking member having a pivotal connection providing pivotally mounting of the blocking member on the housing between the spaced plates thereof for movement between a blocking position and a released position, the blocking member including a blocking portion on one side of the pivotal connection and a control portion on the opposite side of the pivotal connection from the blocking portion, the seat bottom connector lever contacting the control portion of the blocking member in the generally horizontal seating position to position the blocking member in its released position where its blocking portion permits movement of the friction latch and structural latch from their respective latched positions to their respective released positions to release the keeper and release the housing from the vehicle floor, the seat bottom connector lever upon movement to its generally vertical tumble position allowing movement of the blocking member to its blocking position where the blocking portion of the blocking member blocks movement of the friction latch and the structural latch from their respective latched positions to their respective released positions to maintain securement of the housing to the keeper and the vehicle floor.

2. A vehicle seat front floor latch and seat positioner assembly as in claim 1 wherein the blocking member is made of a synthetic resin.

3. A vehicle seat front floor latch and seat positioner assembly as in claim 1 wherein the housing includes a keeper opening for cooperating with a second keeper on the vehicle floor and the first mentioned keeper on the vehicle floor to secure the housing to the vehicle floor.

4. A vehicle seat front floor latch and seat positioner assembly as in claim 1 wherein the housing includes at least one wheel for facilitating removal of the assembly from the vehicle.

5. A vehicle seat front floor latch and seat positioner assembly as in claim 1 wherein the housing includes front and rear wheels for facilitating removal of the assembly from the vehicle.

6. A vehicle seat front floor latch and seat positioner assembly as in claim 1 further including a spring that biases the seat bottom connector lever from its generally horizontal seating position toward its generally vertical tumble position, the control cam having a first portion that when in its locking position contacts the seat bottom connector portion in its generally vertical tumble position to prevent movement of the seat bottom connector lever to its generally horizontal seating position, and the control cam having a second portion that when in its locking position contacts the seat bottom connector lever to prevent movement from its generally horizontal seating position to its generally vertical tumble position.

7. A vehicle seat front floor latch and seat positioner assembly as in claim 6 wherein the second portion of the control cam in its locking position allows a slight amount of angular movement less than 10 degrees of the seat bottom connector lever from its generally horizontal seating position toward its generally vertical tumble position before contacting the seat bottom connector lever to prevent farther movement to the generally vertical tumble position under the bias of the spring.

8. A vehicle seat front floor latch and seat positioner assembly as in claim 7 wherein the first portion of the control cam contacts the seat bottom connector lever at a first portion thereof and the second portion of the control cam contacts the seat bottom connector lever at a second portion thereof spaced from its first portion.

9. A vehicle seat front floor latch and seat positioner assembly as in claim 1 further including a spring that biases the blocking member from its released position toward its blocking position.

10. A vehicle seat front floor latch and seat positioner assembly comprising:
- a housing for connection to vehicle floor adjacent the front of a vehicle seat bottom and including a pair of spaced plates;
- front and rear wheels on the housing;
- a seat bottom connector lever for connection to a vehicle seat bottom and pivotally mounted between the pair of spaced plates of the housing for movement between a generally horizontal seating position and a generally vertical tumble position, and a spring that biases the seat bottom connector lever from its generally horizontal seating position toward its generally vertical tumble position;
- a control cam pivotally mounted between the spaced plates of the housing and having a locking position for holding the seat bottom connector lever in either its generally horizontal seating position or its generally vertical tumble position, the control cam having a released position where the seat bottom connector lever is free to move between its generally horizontal seating position and its generally vertical tumble position, the control cam having a first portion that when in its locking position contacts the seat bottom connector portion in its generally vertical tumble position to prevent movement of the seat bottom connector lever to its generally horizontal seating position, the control cam having a second portion hat when in its locking position contacts the seat bottom connector lever to prevent movement from its generally horizontal position to its generally vertical tumble position, while allowing a slight amount of angular movement less than 10 digress of the seat bottom connector lever from its generally horizontal seating position toward its generally vertical tumble position before contacting the seat bottom connector lever to prevent farther movement to the generally vertical tumble position under the bias of the spring, and the first portion of the control cam contacting the seat bottom connector lever at a first portion thereof and the second portion of the control cam contacting the seat bottom connector lever at a second portion thereof spaced from its first portion;
- a latch mechanism including a friction latch and a structural latch pivotally mounted about a common axis between the spaced plates of the housing, the friction latch having a latched position for contacting a keeper on the vehicle floor with an inclined pressure angle to secure the housing to the vehicle floor, the friction latch being movable to a released position to release the keeper, the structural cam having a latched position for facing the keeper in a spaced relationship at a generally zero pressure angle to secure the housing to the vehicle floor upon loading of the latch mechanism above a load limit of the friction latch, and the structural latch having a released position to release the keeper;
- a blocking member made of a synthetic resin and having a pivotal connection providing pivotally mounting of the blocking member on the housing between the spaced plates thereof for movement between a blocking position and a released position, a spring that biases the blocking member from its released position toward its blocking position, the blocking member including a blocking portion on one side of the pivotal connection and a control portion on the opposite side of the pivotal connection from the blocking portion, the seat bottom connector lever contacting the control portion of the blocking member in the generally horizontal seating position to position the blocking member in its released position where its blocking portion permits movement of the friction latch and structural latch from their respective latched positions to their respective released positions to release the keeper and release the housing from the vehicle floor, the seat bottom connector lever upon movement to its generally vertical tumble position allowing movement of the blocking member to its blocking position where the blocking portion of the blocking member blocks movement of the friction latch and the structural latch from their respective latched positions to their respective released positions to maintain securement of the housing to the keeper and the vehicle floor.

* * * * *

UNITED STATES PATENT AND TRADEMARK OFFICE
CERTIFICATE OF CORRECTION

| | | |
|---|---|---|
| PATENT NO. | : 8,333,421 B2 | Page 1 of 1 |
| APPLICATION NO. | : 13/052224 | |
| DATED | : December 18, 2012 | |
| INVENTOR(S) | : Michael A. Blake et al. | |

It is certified that error appears in the above-identified patent and that said Letters Patent is hereby corrected as shown below:

In the Claims:

Column 14, Line 4, Claim 10:

After "having a second portion" delete "hat" and
Insert -- that --.

Signed and Sealed this
Fourteenth Day of May, 2013

Teresa Stanek Rea
*Acting Director of the United States Patent and Trademark Office*